United States Patent [19]
Kern et al.

[11] Patent Number: 5,820,457
[45] Date of Patent: Oct. 13, 1998

[54] AIR NOZZLE

[75] Inventors: Alfred Kern, Schneeberg; Wolfgang Knühl, Buchen; Roland Gruner, Robern, all of Germany

[73] Assignee: Aurora Konrad G. Schulz GmbH & Co., Odenwald, Germany

[21] Appl. No.: 778,792

[22] Filed: Jan. 3, 1997

[30] Foreign Application Priority Data

Jan. 4, 1996 [DE] Germany .................. 196 00 205.2

[51] Int. Cl.⁶ .................................................. B60H 1/24
[52] U.S. Cl. ........................................... 454/315; 454/319
[58] Field of Search ........................ 239/553.5, 590.5, 239/451; 454/309–315, 319

[56] References Cited

U.S. PATENT DOCUMENTS

| | | | |
|---|---|---|---|
| 3,701,311 | 10/1972 | McLarty | 454/319 |
| 3,823,875 | 7/1974 | Bauer et al. | 239/590.5 X |
| 5,080,002 | 1/1992 | Soethout et al. | 454/313 X |
| 5,188,561 | 2/1993 | Nissimoff et al. | 454/315 X |
| 5,573,458 | 11/1996 | Chu | 454/315 |

FOREIGN PATENT DOCUMENTS 1320695   6/1973   United Kingdom ............ 454/315

*Primary Examiner*—Kevin Weldon
*Attorney, Agent, or Firm*—Robert W. Becker & Associates

[57] ABSTRACT

An air nozzle has an air nozzle body and a lamella arrangement for directing the air flow exiting from the air nozzle. The lamella arrangement includes first lamellas connected to the air nozzle body so as to be pivotable about parallel-extending first pivot axes. A roller is fastened within the air nozzle body so as to be pivotable about a second pivot axis. The roller has second lamellas positioned slantedly to the second pivot axis. The second pivot axis and the first pivot axes extend parallel to one another.

16 Claims, 2 Drawing Sheets

AIR NOZZLE

BACKGROUND OF THE INVENTION

The present invention relates to an air nozzle, especially for use in vehicles, comprising a lamella arrangement for deflecting the air flow exiting from the air nozzle. The lamella arrangement is supported within a nozzle body such that the lamelas are pivotable together. The lamella arrangement comprises substantially parallel extending lamellas.

Such air nozzles have been known for a long time and are, for example, disclosed in U.S. Pat. No. 2,894,441. In this prior art embodiment two lamella arrangements are positioned in a crossed arrangement so as to affect the exit direction of the air flow of the air nozzle in two dimensions. However, this prior art solution requires a comparatively high mounting expenditure and numerous, parts to be manufactured individually. The actuation of the lamellas is also relatively complicated and the exposed actuating elements of the lamellas are prone to soiling so that there is the risk of dust particles etc. depositing in constructively required corners of the design. Thus, the prior art solution has not been accepted in practice.

A more sturdy construction which can be manufactured less expensively and which is used in similar designs in a wide range of applications is known from German published document 26 28 663. In this embodiment the lamellas are supported on a pivot axle in a transverse arrangement. Conventionally, this pivot axle has a longitudinal extension so that the pivotable lamellas are comparatively short; a large number of lamellas is thus required. The air resistance of this prior art solution is essentially rather small. However, especially in narrow air nozzles which still must comprise the needed flow cross-section, a great number of lamellas must be mounted. Furthermore, in some cases, the projecting position of pivot axle parts upon adjusting of the pivot angle is aesthetically unpleasing. For the adjustment about the horizontal axis no adjusting element is provided; instead, the pivot axle body itself is displaced by pressing onto a suitable location. This makes an accidental displacement of the nozzle upon impact possible.

It is therefore an object of the present invention to provide an air nozzle of the aforementioned kind which, with respect to operation and assembly as well as mounting, is further improved, especially is also suitable for locations where only minimal space is available and which furthermore provides, relative to its size, a relatively great free flow cross-section.

SUMMARY OF THE INVENTION

The air nozzle according to the present invention is primarily characterized by:

An air nozzle body;

A lamella arrangement for directing an air flow exiting from the air nozzle;

The lamella arrangement comprising first lamellas connected to the air nozzle body so as to be pivotable about parallel-extending first pivot axes;

A roller fastened within the air nozzle body so as to be pivotable about a second pivot axis;

The roller comprising second lamellas positioned slantedly to the second pivot axis;

The second pivot axis and the first pivot axes extending parallel to one another.

The air nozzle preferably further comprises a first control disk, connected to a first lateral side of the air nozzle body, for pivoting the first lamellas of the first lamella arrangement, and a second control disk, connected to a second lateral side of the air nozzle body, for pivoting the roller.

The air nozzle may further comprise a reduction gear arrangement interposed between the roller and the second control disk. The second control disk is positioned in a recessed manner at the front end of the air nozzle body such that a peripheral portion of the second control disk projects from the front end, wherein a rotation of the second control disk about an angular distance identical to the peripheral portion is transmitted by the reduction gear arrangement to the roller and causes a rotation of the roller by 180°.

Preferably, the first control disk has a follower cutout located at the first control disk so as to be spaced from the pivot axis of a neighboring one of the first lamellas. The axis of rotation of the first control disk and the pivot axis of the neighboring first lamella are spaced from one another. The follower cutout entrains the neighboring first lamella when the first control disk is rotated.

The first lamellas are preferably identical to one another. The neighboring first lamella has a follower engaging the follower cutout.

The lamella arrangement comprises preferably at least one pivot member for connecting the first lamellas to one another such that the first lamellas are pivoted together by the follower. The pivot member is preferably curved so as to extend parallel to the curved outer surface of the front end.

The first lamellas are curved parallel to the curved outer surface of the front end, when viewed in a direction perpendicular to the first pivot axis.

The first control disk is preferably positioned in a recessed manner at the front end of the air nozzle body such that a peripheral portion of the first control disk projects from the front end. The first control disk, for pivoting the first lamellas about a maximum pivot range, is pivotable about an angular distance identical to the peripheral portion.

The air nozzle body has an elongate shape and the first and second lamellas are elongate and extend in a longitudinal direction of the air nozzle body. Expediently, the first and the second lateral sides are located at opposite ends of the air nozzle body in the longitudinal direction. The air nozzle body has an air flow outlet having a free flow cross-section with a length/height ratio of greater than 2. The length/height ratio is preferably 100 to 40.

The first pivot axes are preferably arranged at the front end of the air nozzle body.

The front end has a curved outer surface and the first pivot axes are arranged on a curve parallel to the curved outer surface of the front end.

The first pivot axes are located at one longitudinal side of the lamellas.

Advantageously, the first lamellas are pivotable by at least 90° and determine the orientation of the air flow in a first direction. The second lamellas, depending on the position of the roller, determine the orientation of the air flow in a second direction.

Preferably, the air nozzle further comprises a shut-off flap positioned within the air nozzle body upstream of the roller in a direction of air flow and an actuating element connected to the front end of the air nozzle body and acting on the shut-off flap for controlling air flow, including shutting off air flow.

The air nozzle is preferably of a modular design.

The first lamellas are pivotable over a pivot range of 140°. The pivot range advantageously includes a 0° position in which the air nozzle is closed and a 90° position in which the air nozzle is completely open.

With the inventive measures it is surprisingly possible to provide an air nozzle of a simple design that combines the advantages of a roller with the advantages of a nozzle with crossed lamella arrangements. The roller provided with slantedly arranged lamellas is essentially known from U.S. Pat. No. 3,683,787. The disclosure of U.S. Pat. No. 3,683,787 is herewith incorporated by reference. Such a roller is easy to manufacture and can be easily mounted as a compact part. It allows, when oriented correspondingly, a comparatively large free flow cross-section and an excellent air deflection in a plane transverse to its pivot axis.

By arranging the axis of the roller and the axes of the lamella arrangement parallel to one another the following advantages result for an elongate air nozzle.

Only a small number of lamellas which extend over the entire length of the air nozzle must be mounted. The control disks can be positioned at the front end so that only a minimal amount of space available for the free flow cross-section will be lost and arrangements even for very narrow nozzles under correspondingly limited spatial conditions are possible. The inventive air nozzle provides an aesthetically pleasing appearance without projection parts whereby in this context it is advantageous to arrange the pivot axes of the lamella arrangement in direct vicinity of the front end of the air nozzle.

By providing a gear system between the roller and the corresponding control disk, the reduction ratio can be adjusted in a simple manner according to specific requirements. For this purpose, it is only necessary to adapt accordingly the diameter of the gear wheels to be employed, especially toothed wheels or segments of toothed wheels. It is understood that optionally the toothed wheel segment which is fixedly connected to the control disk is provided with end position abutments in a manner known per se in order to limit the pivot range in a suitable manner.

In the alternative it is also possible to provide a circular toothed wheel in order to allow for any desired rotation of the roller in both directions. Due to the slantedly arranged lamellas of the roller that have a substantially oval contour the air in the shown embodiment is, for example, deflected to the right. When pivoting by 90°, the exit angle of the air flow is continuously decreased until, in the 90° position, it is reduced to 0, i.e., the roller allows straight, undeflected air flow. A further rotation of the roller then causes the air exiting from the air nozzle to be deflected in the opposite direction, i.e., to the left until the 180° position is reached. Upon further rotation past this 180° position the air exit angle is again reduced until, at the 270° position, it is again 0. Upon further rotation the initial position is again reached.

It is especially advantageous to embody the inventive air nozzle so as to be of a modular design.

For example, the lamellas of the roller can be embodied as identical, molded plastic parts. In an advantageous embodiment only one follower is provided at one of the lamellas for engaging the corresponding control disk while the other potential followers are cut off. For respective modular dimensions, the same lamellas can also be used for furnishing nozzles of different length which simplifies pre-manufacturing and storage. It is also possible to provide the air nozzle body in the form of an injection-molded part with recesses which, for example, allow the insertion of an additional shut-off flap. This flap can be arranged upstream of the roller in the direction of air flow and can be used when it is desired to provide a further sealing function in addition to the roller with lamellas itself so as to ensure an air-tight closure of the air nozzle.

In another advantageous embodiment it is suggested to support the lamellas of the roller such that in their position of maximum closure they extend in one plane whereby the lamellas are then arranged such that they abut one another in order to provide a sealing action. Optionally, plastic lips can be provided at the lamellas in order to improve the sealing action or the lamellas can be manufactured of a rather soft, elastic plastic material which also improves the sealing action.

It is understood that the pivot angle of the lamella arrangement can be adapted within a wide range according to specific requirements. For example, the pivot angle for certain embodiments may be greater than 90°, for example, when it is desired to deflect the air flow from the 0° position (undeflected flow) in both directions.

In an aesthetically especially pleasing embodiment it is suggested to position the lamellas on an outwardly curved plane. This additionally provides also space for the roller in the nozzle body and reduces the depth required for mounting the air nozzle. However, it is still possible without problems to achieve a joint pivoting of the lamellas via a rod-shaped pivot member which is then preferably also of a curved design.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
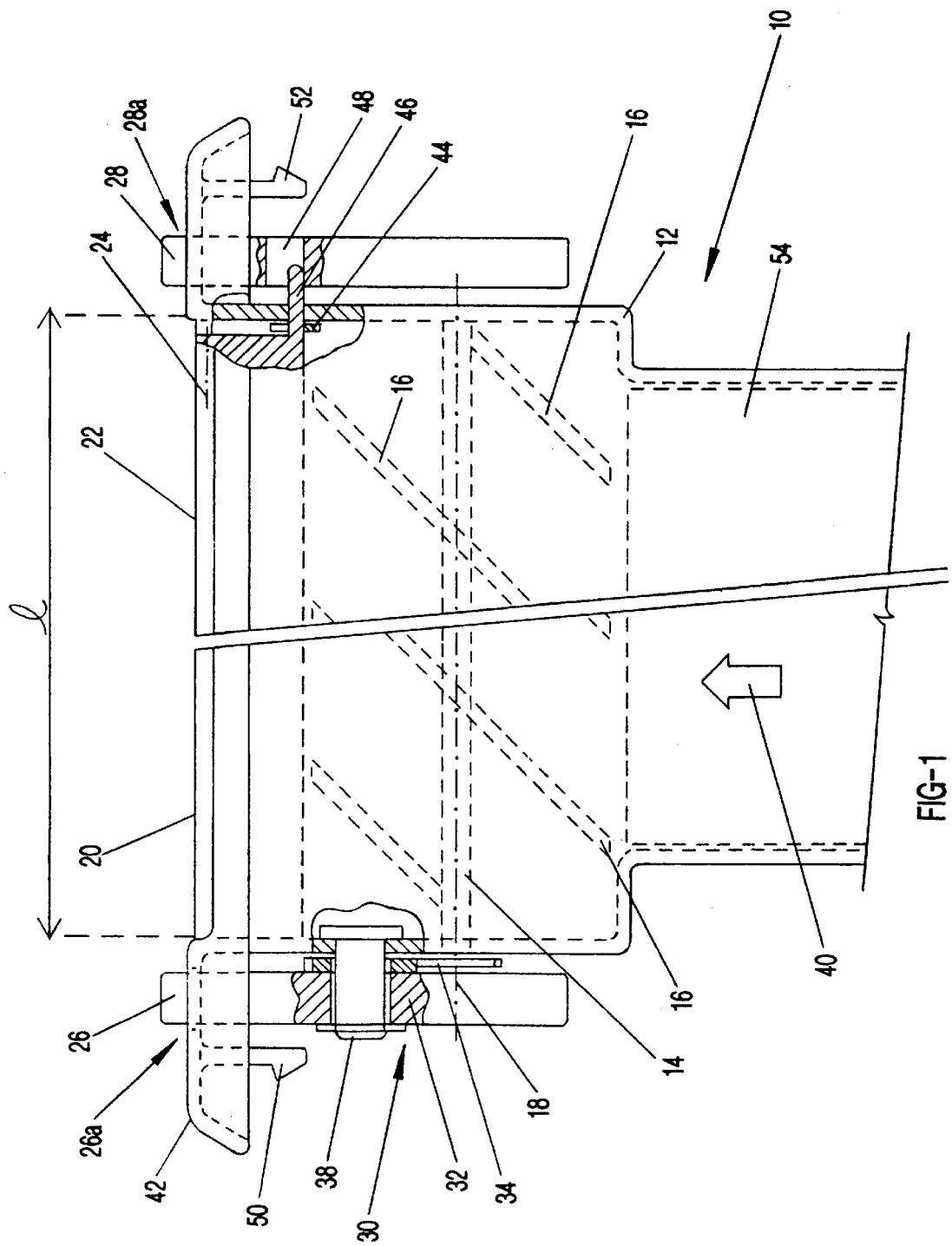
FIG. 1 is a schematic part-sectional view of one embodiment of the inventive air nozzle.

The present invention will now be described in detail with the aid of a specific embodiment utilizing FIGS. 1 and 2.

The air nozzle 10 comprises an air nozzle body 12 in which a roller 14 with slantedly arranged lamellas 16 is supported so as to be pivotable about pivot axis (or axis of rotation) 18. Downstream of the roller 14 a lamella arrangement 20 with individual lamellas 22 is supported whereby each lamella 22 is pivotable about a pivot axis 24 within the air nozzle body 12. The pivot axes 24 and 18 extend substantially parallel to one another. At the ends of the pivot axes a control disk 26 for the roller 14 and a control disk 28 for the lamella arrangement 20 are provided, respectively.

The control disk 26 is connected with a reduction gear arrangement 30 to the roller 14. The reduction gear arrangement 30 comprises a large gear wheel 32 and a smaller gear wheel 34 which mesh with one another and, based on their different diameters, provide a reduction gear between the control disk 26 and the roller 14.

In the represented embodiment the reduction ratio is approximately 3:1 so that pivoting of the control disk 26 by 120° results in a rotation of the roller 14 by 360°. It is preferred to provide a pivot range of 60° for the control disk 26 whereby the center position of the control disk 26 then corresponds to the center position of the lamellas 16 of the roller 14. In the latter center position the lamellas 16 are pivoted by 90° relative to the position represented in FIG. 1 and allow for free (unobstructed) air flow. In a position displaced by 30° in one direction relative to the center position of the control disk 26, the lamellas 16 are pivoted by 90°, for example, to the right as represented in FIG. 1, and, when displaced by 30° in the opposite direction, air flow 40 is deflected completely, i.e., in the opposite direction to the left.

It is understood that the respective support of the gear arrangement 30 as well as of the roller 14 and the control disk 26 within the air nozzle body 12 is such that it can be easily adapted to specific requirements. It is preferred to provide a flat, compact design also for the gear wheels 32 and 34 in order to provide favorable support angles and in order to limit the construction size of the nozzle as much as possible. The design according to FIG. 1 shows in this context a rather wide bearing pin 38. The control disk 26 can be quickly secured with a spring ring and optionally a non-represented washer on the bearing pin 32. The control disk 26, and also the control disk 28 penetrate with a peripheral portion 26a, 28a the outer surface of the front end 42 of the air nozzle body 12. The respective recess is only slightly larger than the control disks 26, 28. In this embodiment a one sided support of the control disk 26 is sufficient.

The lamella arrangement 20 is comprised of identical elongate lamellas 22. The lamellas 22 are supported on uniformly spaced pivot axes 24 and are entrained together by a pivot member 44 which is pivotably supported on the pins 46, as is known per se. One of the pins 46 penetrates the wall of the nozzle body 12 as well as at least partially the control disk 28 and acts as a follower guided in a corresponding follower cutout 48. The design of the follower (46) and of the follower cutout 48 is shown in more detail in FIG. 2.

In the represented embodiment the air nozzle body 12 is provided with catch pins 50 and 52 projecting rearwardly from the front end 42. The catch pins 50, 52 provide a snap connection of the entire air nozzle 10 in a respective cutout or receiving chamber of the car body or the dashboard.

Furthermore, upstream of the roller 14 a shut-off flap 54 may optionally be provided and should also be adjustable with a suitable actuating element from the front end 42 of the air nozzle 10. This shut-off flap 54 should only be provided when desired. The air nozzle body may be provided with respectively prepared bearing recesses to accommodate the shut-off flap 54.

Figure 2:
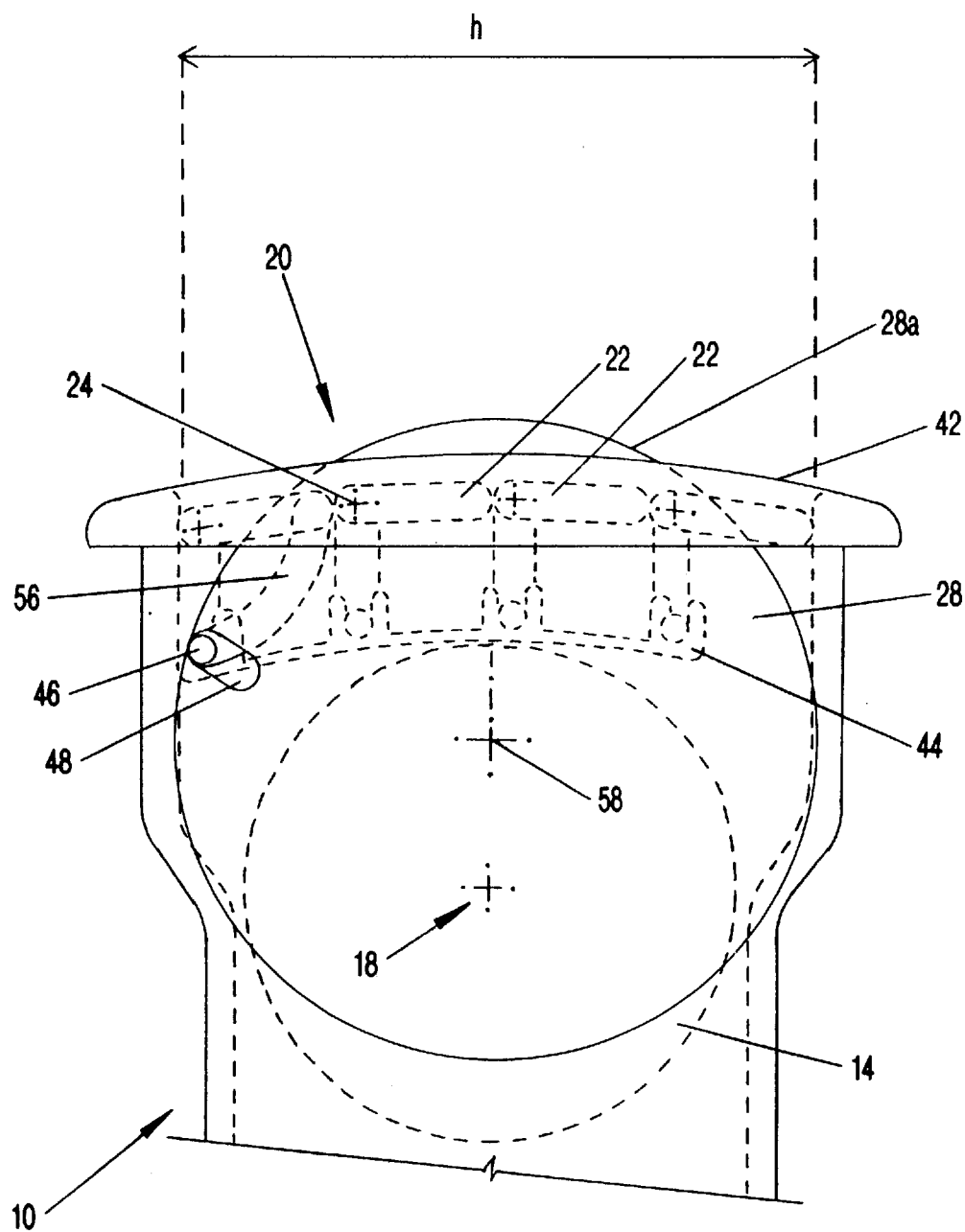
FIG. 2 shows a side view of the air nozzle of FIG. 1 in a schematic representation.

As can be seen in FIG. 2, four elongate lamellas 22 extend parallel to one another and are shaped according to the curvature of the curved outer surface of the front end 42 of the nozzle body 12. As is shown in the drawing, pivoting of the lamellas 22 about an angle of approximately 90° is carried out with the aid of the lamella to the left in the drawing which is provided with the follower 46. The control disk 28 is provided with a matching follower cutout 48 and a corresponding curved cutout 56 in the wall of the nozzle body 12 which allows for a movement of the follower 46 in the desired manner. FIG. 2 also shows the embodiment of the pivot member 44 in more detail which is snapped onto at least two pins 46 and which has recesses for entraining the pins 46 of further lamellas 22.

It is understood that other embodiments of the inventive air nozzle are possible without deviating from the the inventive concept. For example, the pivot range of the control disk 28 may be increased. For this purpose, it is possible to use the (follower) pin 46 of the lamella that is adjacent to the lamella on the far left of the drawing. Its distance from the axis 58 of the control disk 28 is somewhat smaller so that for the same range of movement of the lamellas a greater pivoting range of the control disk is needed.

It is understood that the respective follower cutouts 48 and 56 must be adapted as needed. Furthermore, the lamellas 22, when providing a corresponding support, can be pivoted past the 90° position if so desired. For example, the maximum pivot position, relative to the represented position of FIG. 2, can be 140° or, if needed, even 160° so that the air flow, in the representation of FIG. 2, can also be directed to the upper right corner.

The air nozzle has an air flow outlet defined by length l and height h whereby preferably the length to height ratio l/h is greater than 2, especially 100:40.

The present invention is, of course, in no way restricted to the specific disclosure of the specification and drawings, but also encompasses any modifications within the scope of the appended claims.

What we claim is:

1. An air nozzle comprising:

an air nozzle body;

a lamella arrangement for directing an air flow exiting from said air nozzle;

said lamella arrangement comprising first lamellas connected to said air nozzle body so as to be pivotable about parallel-extending first pivot axes;

a roller fastened within said air nozzle body so as to be pivotable about a second pivot axis;

said roller comprising second lamellas positioned slantedly to said second pivot axis;

said second pivot axis and said first pivot axes extending parallel to one another;

a first control disk, connected to a first lateral side of said air nozzle body, for pivoting said first lamellas of said lamella arrangement; and a second control disk, connected to a second lateral side of said air nozzle body, for pivoting said roller;

said first control disk having a follower cutout located at said first control disk so as to be spaced from the pivot axis of a neighboring one of said first lamellas;

an axis of rotation of said first control disk and the pivot axis of said neighboring one of said first lamellas spaced from one another; and said follower cutout entraining said neighboring one of said first lamellas when said first control disk is rotated.

2. An air nozzle according to claim 1, further comprising a reduction gear arrangement interposed between said roller and said second control disk, wherein said second control disk is positioned in a recessed manner at a front end of said air nozzle body such that a peripheral portion of said second control disk projects from said front end, wherein a rotation of said second control disk about an angular distance identical to said peripheral portion is transmitted by said reduction gear arrangement to said roller and causes a rotation of said roller by 180°.

3. An air nozzle according to claim 1, wherein said first lamellas are identical to one another and wherein said neighboring one of said first lamellas has a follower engaging said follower cutout.

4. An air nozzle according to claim 3, wherein said lamella arrangement comprises at least one pivot member for connecting said first lamellas to one another such that said first lamellas are pivoted together by said follower, said pivot member being curved so as to extend parallel to said curved outer surface of said front end.

5. An air nozzle according to claim 4, wherein said first lamellas are curved parallel to said curved outer surface of said front end, when viewed in a direction perpendicular to said first pivot axes.

6. An air nozzle according to claim 1, wherein:

said first control disk is positioned in a recessed manner at a front end of said air nozzle body such that a peripheral portion of said first control disk projects from said front end;

said first control disk, for pivoting said first lamellas about a maximum pivot range, is pivotable about an angular distance identical to said peripheral portion.

7. An air nozzle according to claim 1, wherein said air nozzle body has an elongate shape and wherein said first and second lamellas are elongate and extend in a longitudinal direction of said air nozzle body, wherein said first and said second lateral sides are located at opposite ends of said air nozzle body in said longitudinal direction, wherein said air nozzle body has an air flow outlet having a free flow cross-section with a length/height ratio of greater than 2.

8. An air nozzle according to claim 7, wherein said length/height ratio is 100:40.

9. An air nozzle according to claim 1, wherein said first pivot axes are arranged at a front end of said air nozzle body.

10. An air nozzle according to claim 9, wherein said front end has a curved outer surface and wherein said first pivot axes are arranged on a curve parallel to said curved outer surface of said front end.

11. An air nozzle according to claim 1, wherein said first pivot axes are located at one longitudinal side of said lamellas.

12. An air nozzle according to claim 1, wherein:

said first lamellas are pivotable by at least 90° and determine the orientation of the air flow in a first direction;

said second lamellas, depending on a position of said roller, determine the orientation of the air flow in a second direction.

13. An air nozzle according to claim 1, further comprising a shut-off flap positioned within said air nozzle body upstream of said roller in a direction of air flow and an actuating element connected to a front end of said air nozzle body and acting on said shut-off flap for controlling air flow, including shutting off air flow.

14. An air nozzle according to claim 1 of a modular design.

15. An air nozzle according to claim 1, wherein said first lamellas are pivotable over a pivot range of 140°.

16. An air nozzle according to claim 15, wherein said pivot range includes a 0° position in which said air nozzle is closed and a 90° position in which said air nozzle is completely open.

* * * * *